United States Patent
Malladi et al.

(10) Patent No.: US 8,341,280 B2
(45) Date of Patent: *Dec. 25, 2012

(54) REQUEST AND RESPONSE DECOUPLING VIA PLUGGABLE TRANSPORTS IN A SERVICE ORIENTED PIPELINE ARCHITECTURE FOR A REQUEST RESPONSE MESSAGE EXCHANGE PATTERN

(75) Inventors: Sastry K. Malladi, Fremont, CA (US); Bhaven Avalani, Cupertino, CA (US)

(73) Assignee: eBay Inc., San Jose, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/346,742

(22) Filed: Dec. 30, 2008

(65) Prior Publication Data

US 2010/0169469 A1    Jul. 1, 2010

(51) Int. Cl.
*G06F 15/16* (2006.01)
(52) U.S. Cl. .................. 709/230; 709/201; 709/206
(58) Field of Classification Search .................. 709/230, 709/201, 206
See application file for complete search history.

(56) References Cited

U.S. PATENT DOCUMENTS

| | | | |
|---|---|---|---|
| 7,120,639 B1 | 10/2006 | de Jong et al. | |
| 7,131,116 B1 | 10/2006 | Krishna | |
| 7,530,074 B1 | 5/2009 | Snodgrass | |
| 7,600,131 B1 | 10/2009 | Krishna et al. | |
| 7,631,107 B2 | 12/2009 | Pandya | |
| 7,636,353 B2 * | 12/2009 | Sandoz et al. | 370/389 |
| 7,694,140 B1 * | 4/2010 | Sachenko et al. | 713/170 |
| 7,835,380 B1 * | 11/2010 | Aloni et al. | 370/419 |
| 8,135,785 B2 * | 3/2012 | Malladi et al. | 709/206 |
| 2001/0054172 A1 | 12/2001 | Tuatini | |
| 2002/0010781 A1 | 1/2002 | Tuatini | |
| 2002/0116454 A1 | 8/2002 | Dyla et al. | |
| 2002/0174340 A1 * | 11/2002 | Dick et al. | 713/178 |
| 2003/0163603 A1 | 8/2003 | Fry et al. | |
| 2003/0172169 A1 * | 9/2003 | Cheng | 709/230 |
| 2003/0172348 A1 | 9/2003 | Fry et al. | |
| 2003/0191803 A1 | 10/2003 | Chinnici et al. | |
| 2004/0015840 A1 | 1/2004 | Walker | |
| 2004/0064503 A1 | 4/2004 | Karakashian et al. | |
| 2004/0064826 A1 | 4/2004 | Lim et al. | |
| 2004/0068728 A1 | 4/2004 | Blevins | |
| 2004/0107414 A1 | 6/2004 | Bronicki et al. | |
| 2005/0066197 A1 * | 3/2005 | Hirata et al. | 713/201 |
| 2005/0080873 A1 * | 4/2005 | Joseph | 709/217 |
| 2005/0108518 A1 | 5/2005 | Pandya | |

(Continued)

OTHER PUBLICATIONS

"U.S. Appl. No. 12/242,639 Notice of Allowance mailed Oct. 26, 2010", 4 pgs.

(Continued)

*Primary Examiner* — Duyen Doan
(74) *Attorney, Agent, or Firm* — Schwegman, Lundberg & Woessner, P.A.

(57) ABSTRACT

A computer-implemented system and method for decoupling processing of request and response messages supporting different pluggable respective transports in a service-oriented pipeline architecture for a request-response Message Exchange Pattern (MEP) is disclosed. The method in an example embodiment includes receiving a message having coded therein information identifying a desired pluggable transport mechanism respectively for a request and a response; processing the message through a message processing pipeline; dispatching the processed message to a dispatcher; determining if the desired pluggable transport mechanism is available; activating the desired pluggable transport mechanism, if the desired pluggable transport mechanism is available; and transporting the processed message via the desired pluggable transport mechanism.

25 Claims, 8 Drawing Sheets

U.S. PATENT DOCUMENTS

| | | | |
|---|---|---|---|
| 2005/0223109 A1 | 10/2005 | Mamou et al. | |
| 2005/0267947 A1 | 12/2005 | Patrick et al. | |
| 2006/0026591 A1 | 2/2006 | Backhouse et al. | |
| 2006/0047780 A1 | 3/2006 | Patnude | |
| 2006/0123039 A1 | 6/2006 | Scheuerle et al. | |
| 2006/0129655 A1* | 6/2006 | Schlimmer et al. | 709/217 |
| 2006/0174016 A1* | 8/2006 | Critchley et al. | 709/228 |
| 2006/0206523 A1 | 9/2006 | Gaurav et al. | |
| 2006/0288208 A1 | 12/2006 | Dashora et al. | |
| 2007/0006068 A1 | 1/2007 | Kren | |
| 2007/0011126 A1 | 1/2007 | Conner et al. | |
| 2007/0044069 A1 | 2/2007 | Doucette et al. | |
| 2007/0145138 A1 | 6/2007 | Snyder et al. | |
| 2007/0150595 A1* | 6/2007 | Bhorania et al. | 709/226 |
| 2007/0168228 A1 | 7/2007 | Lawless | |
| 2007/0174288 A1* | 7/2007 | Stoyanova | 707/10 |
| 2007/0250766 A1* | 10/2007 | Medi et al. | 715/513 |
| 2007/0288488 A1 | 12/2007 | Rohrs et al. | |
| 2008/0010629 A1 | 1/2008 | Berg et al. | |
| 2008/0046874 A1 | 2/2008 | Kostoulas et al. | |
| 2008/0049022 A1* | 2/2008 | Sherb et al. | 345/440 |
| 2008/0177848 A1 | 7/2008 | Wakhlu | |
| 2008/0195634 A1 | 8/2008 | Christensen et al. | |
| 2008/0209451 A1 | 8/2008 | Michels et al. | |
| 2008/0222617 A1 | 9/2008 | Fernando et al. | |
| 2008/0313372 A1* | 12/2008 | Fong et al. | 710/105 |
| 2008/0320019 A1 | 12/2008 | Bireley | |
| 2009/0006429 A1 | 1/2009 | Champion et al. | |
| 2009/0112902 A1 | 4/2009 | Sthanikam et al. | |
| 2009/0125628 A1* | 5/2009 | Dahlen | 709/227 |
| 2009/0150905 A1 | 6/2009 | Lin et al. | |
| 2010/0082830 A1* | 4/2010 | Malladi et al. | 709/230 |
| 2010/0083277 A1* | 4/2010 | Malladi et al. | 719/313 |
| 2010/0083281 A1* | 4/2010 | Malladi et al. | 719/317 |

OTHER PUBLICATIONS

"U.S. Appl. No. 12/242,639, Non-Final Office Action mailed Jun. 9, 2010", 8 pgs.

"U.S. Appl. No. 12/242,639, Response filed Oct. 12, 2010 to Non Final Office Action mailed Jun. 9, 2010", 10 pgs.

"U.S. Appl. No. 14/242,639 Notice of Allowance mailed Jan. 26, 2011", 4 pgs.

"U.S. Appl. No. 12/242,630, Non Final Office Action mailed May 26, 2011", 9 pgs.

"U.S. Appl. No. 12/242,629, Non Final Office Action mailed Feb. 1, 2012", 38 pgs.

"U.S. Appl. No. 12/242,639, Notice of Aliowance maiied Nov. 8, 2011", 5 pgs.

"U.S. Appl. No. 12/242,639, Response filed Oct. 26, 2011 to Non Final Office Action mailed May 26, 2011", 11 pgs.

"U.S. Appl. No. 12/242,653 , Response filed Jan. 17, 2012 to Non Final Office Action mailed Sep. 16, 2011", 12 pgs.

"U.S. Appl. No. 12/242,653, Non Final Office Action mailed Sep. 16, 2011", 29 pgs.

* cited by examiner

```
<transport-config>

<!- The transport implementation needs to implement a specified
interface →

<transport name="MyCustomTransport"
    class="com.ebay.transpors.MyCustomTransportImpl"
    <default-options>
        <invocation-timeout>100 </invocation-timeout>
        <num-connection-retries>3 </num-connection-retries>
        ...
    </default-options>
</transport>

<!- plugin in other transports .. ->

</transport-config>
```

Figure 5

```
<invocation-options>
<preferred-transport>
   <!- By default, transport used for response is same
       as that of request, unless explicitly specified.
       optional-attributes below indicates one or more
       transport specific optional attributes like timeout,
       connection queue length etc.
    →
   <request name="HTTP1.1" optional-attributes=".." />
   <response name="SMTP" optional-attributes=".." />
</preferred-transport>

<!- Other invocation options →
</invocation-options>
```

Figure 6

REQUEST AND RESPONSE DECOUPLING VIA PLUGGABLE TRANSPORTS IN A SERVICE ORIENTED PIPELINE ARCHITECTURE FOR A REQUEST RESPONSE MESSAGE EXCHANGE PATTERN

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

BACKGROUND

1. Technical Field

This disclosure relates to methods and systems supporting computing and data processing systems. More particularly, the disclosure relates to decoupling processing of request and response messages supporting multiple pluggable respective transports in a service-oriented pipeline architecture.

2. Related Art

In Service Oriented Architecture (SOA), there are typically many communicating reusable services that are deployed in several machines. In large-scale enterprises, like eBay, eTrade, or Google for example, there could be thousands of different services deployed in thousands of machines. It is most common and efficient for these services to communicate with each other. Further, external access is also typically provided for some of these services. In communicating with each other, various different types of communication protocols may be used for efficiently and optimization reasons. Communication between service providers and service consumers can be accomplished using some pre-defined protocol. In the web services case, this protocol can be the Simple Object Access Protocol (SOAP). SOAP is a protocol for exchanging Extensible Mark-up Language (XML)-based messages over computer networks, normally using Hypertext Transfer Protocol (HTTP/HTTPS). SOAP often forms the foundation layer of the web services protocol stack providing a basic messaging framework upon which abstract layers can be built. There are several different types of messaging patterns in SOAP; but, by far the most common is the Remote Procedure Call (RPC) pattern, in which one network node (the client) sends a request message to another node (the server) and the server immediately sends a response message to the client. In a typical SOA implementation, Service Consumers communicate with Service Providers using a specific underlying transport protocol (e.g., HTTP). There are several Message Exchange Patterns (MEP) for interactions between a service consumer and a service provider. In a Request-Response MEP, typically the response is sent back using the same transport the request was sent in. This typically requires the client to hold on to the connection until the response arrives, which could be inefficient and sometimes inconvenient depending on how long the processing of the request takes. It would be desirable, in some cases, to have the response come in potentially via a different transport (e.g., Simple Mail Transfer Protocol—SMTP). Further, most conventional SOA framework products require either use of the same transport for requests and responses in a request-response MEP, or require use of different message exchange patterns, such that responses are processed off-line and communicated via other means. For these reasons, it would be beneficial to decouple request and response processing, including their transports, for a request-response MEP, in a SOA. Additionally it is also beneficial to have the system support plugging in custom transports transparently for both requests and responses.

U.S. Patent Application No. 2005/0223109 describes a system wherein services such as product services, real-time services, and common services are deployed in a services oriented architecture. These services may, for example, be deployed for use in a variety of enterprise data integration functions.

U.S. Patent Application No. 2007/0011126 describes a service-oriented architecture (SOA) and accompanying method. In one embodiment, the SOA includes one or more service requesters coupled to one or more service providers via a bus. The bus includes runtime-binding functionality to facilitate interaction between the one or more service requesters and the one or more service providers. A registry, which stores information pertaining to a service provided by the one or more service providers, communicates with one or more service providers and/or requesters and the bus. In a more specific embodiment, bus includes a Service-Integration Bus (SIB) that includes a Service-Factory (SF) module for facilitating implementing the runtime binding functionality and for selectively invoking the service. Functionality of the SOA is strategically organized into various tiers and layers, including a requester tier, a provider tier, a business-process services tier, an infrastructure-services tier, an SIB layer, a persistence layer, and so on.

U.S. Patent Application No. 2005/0267947 describes a system including a service bus, which can act as an intermediary between a client and a service. Messages to the service bus arrive on a transport and can be processed to determine a destination to route and/or publish the message to, a transformation to perform on the message, and/or security processing. The message is then sent out on a transport bound for a service or another service bus. A response to the message can follow an inverse path through the service bus.

Thus, a computer-implemented system and method for decoupling processing of request and response messages supporting different pluggable respective transports in a service-oriented pipeline architecture is needed.

BRIEF DESCRIPTION OF THE DRAWINGS

Embodiments illustrated by way of example and not limitation in the figures of the accompanying drawings, in which:

FIG. 5 illustrates a portion of code that may be used to configure a pluggable transport mechanism in a particular embodiment.

FIG. 6 illustrates a portion of code that may be used to specify the use of a particular pluggable transport mechanism in a particular embodiment.

DETAILED DESCRIPTION

Figure 1:
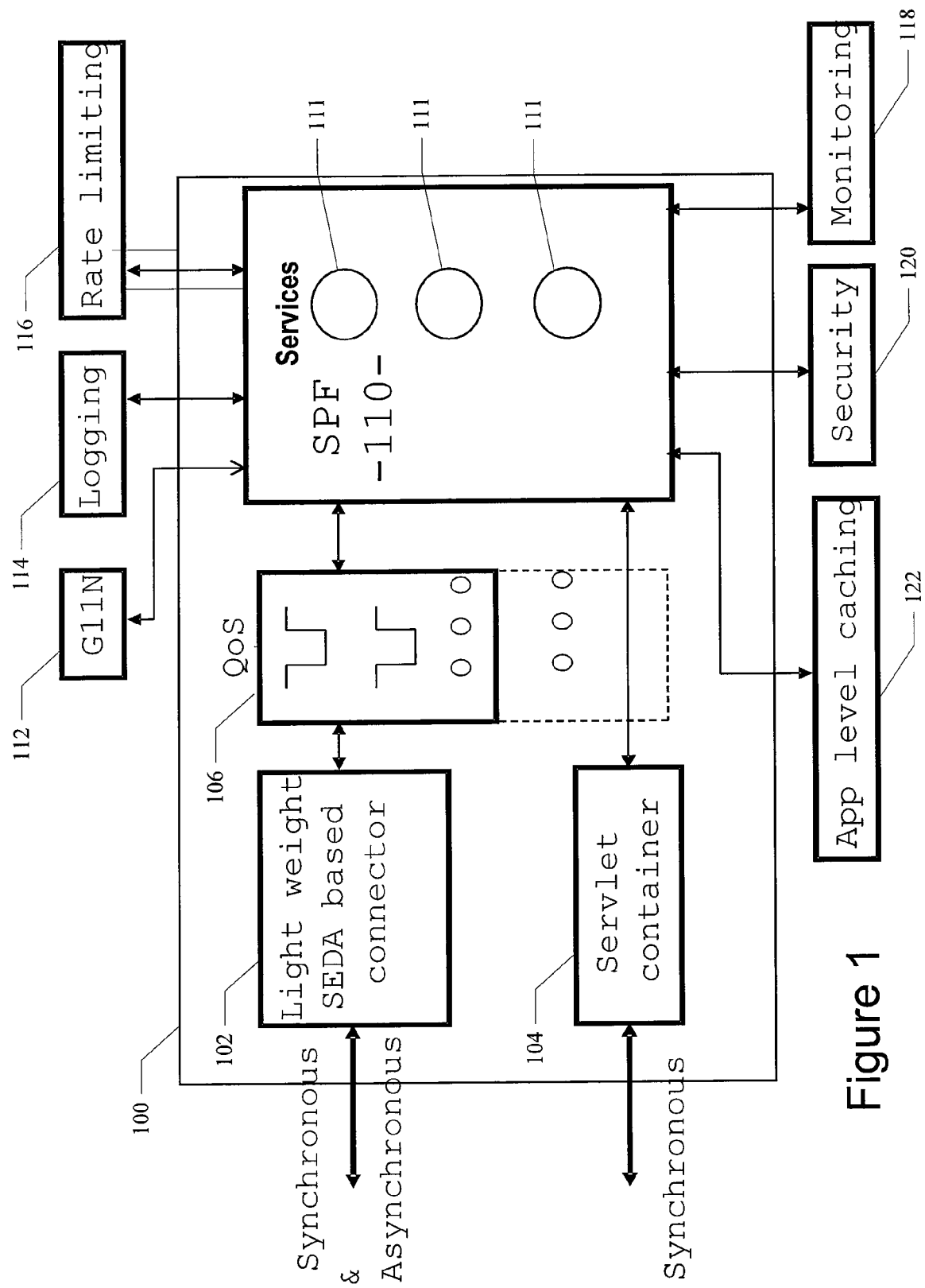
FIG. 1 illustrates an example embodiment of an overall message processing system for services with an Application Server.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for decoupling processing of request and response messages supporting different pluggable respective transports in a service-oriented pipeline architecture. Various embodiments are described below in connection with the figures provided herein.

In particular, as depicted in the various figures included herewith, the SOA message processing model is independent of a specific transport mechanism, as transport-specific processing is made pluggable (e.g. transport processing modules can be added or removed without requiring a significant level of re-design or re-configuration). The decoupling of request and response processing and the ability to plug in custom transports for either of those, allows efficient processing and resource utilization. Additionally, new transport protocols can be added to the SOA seamlessly without having to change the SOA processing model.

The various embodiments described herein include a SOA framework on a pipeline based architecture where requests and responses are processed in separate pipelines. At the end of each pipeline (whether request or response) is a Dispatcher, which dispatches the processed message to the destination. This Dispatcher can be either a request dispatcher or a response dispatcher as the case may be. Additionally, the pipeline is abstracted, such that one of the choices provided for the destination can be a transport mechanism, as is the case with client side request dispatcher and server side response dispatcher. Further, a transport and a specific interface associated with the transport, which each transport can implement, is abstracted. These transports are made available for use, by specifying them in the service and client configuration files. Thus, additional transports can be written and plugged in, on to an existing system, without knowing anything about the framework or affecting existing services. These transports can be selected for request and responses separately. Further, using this de-coupled and pluggable transports architecture, we can implement efficient local binding of services and consumers in the same Java Virtual Machine (JVM) at runtime through simple configuration changes. This is achieved through implementing what is called a 'Local Transport', which is yet another transport implementation that follows the same transport interface, but actually directly hands off the request to the server side request pipeline, without a physical transport being involved. This is a highly desirable thing to have in a large scale distributed computing environment, such as eBay.

Referring to FIG. 1, a diagram illustrates an example embodiment of a computer-implemented system for processing messages in a service-oriented pipeline architecture. In the example application server system 100 illustrated, synchronous or asynchronous messages are received and sent from system 100 either via a staged event-driven architecture (SEDA) interface 102 or a servlet interface 104 for transferring synchronous data streams. The staged event-driven architecture (SEDA) interface 102 decomposes a complex, event-driven software application into a set of stages connected by queues. This design avoids the high overhead associated with thread-based concurrency models, and decouples event and thread scheduling from application logic. By performing admission control on each event queue, the service can be well-conditioned to load, preventing resources from being overcommitted when demand exceeds capacity. SEDA employs dynamic control to automatically tune runtime parameters (such as the scheduling parameters of each stage) as well as to manage load, for example, by performing adaptive load shedding. Decomposing services into a set of stages also enables modularity and code reuse, as well as the development of debugging tools for complex event-driven applications. System 100 can also use a Quality of Service (QoS) module 106 to provide various levels of priority for the incoming message streams. Messages with higher levels of priority can be dispatched more quickly into the Service Provider Framework (SPF) 110 described in more detail below.

Figure 2:
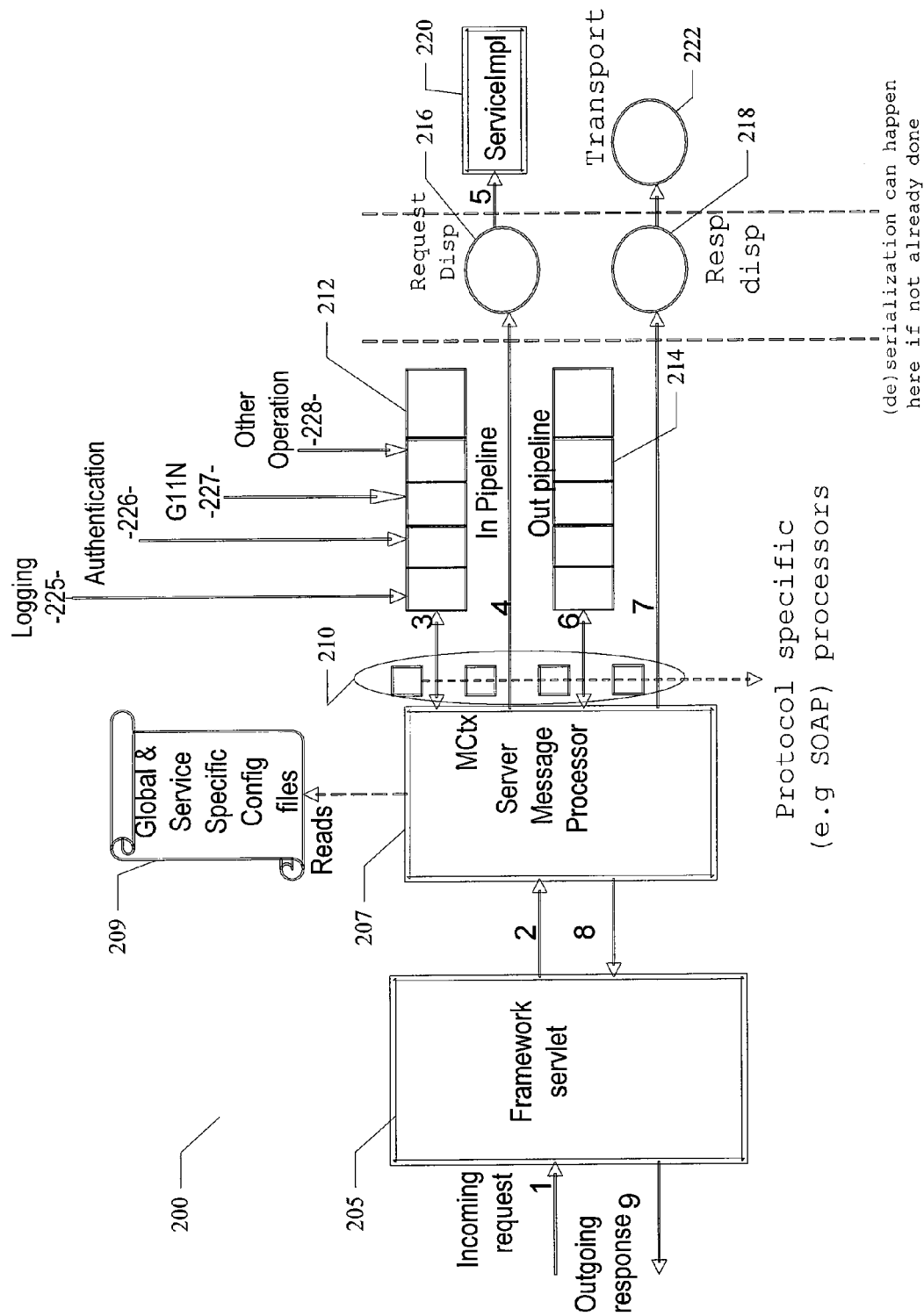
FIG. 2 illustrates an example embodiment of a server-side runtime environment or Service Provider Framework (SPF), using a message pipeline.
Figure 3:
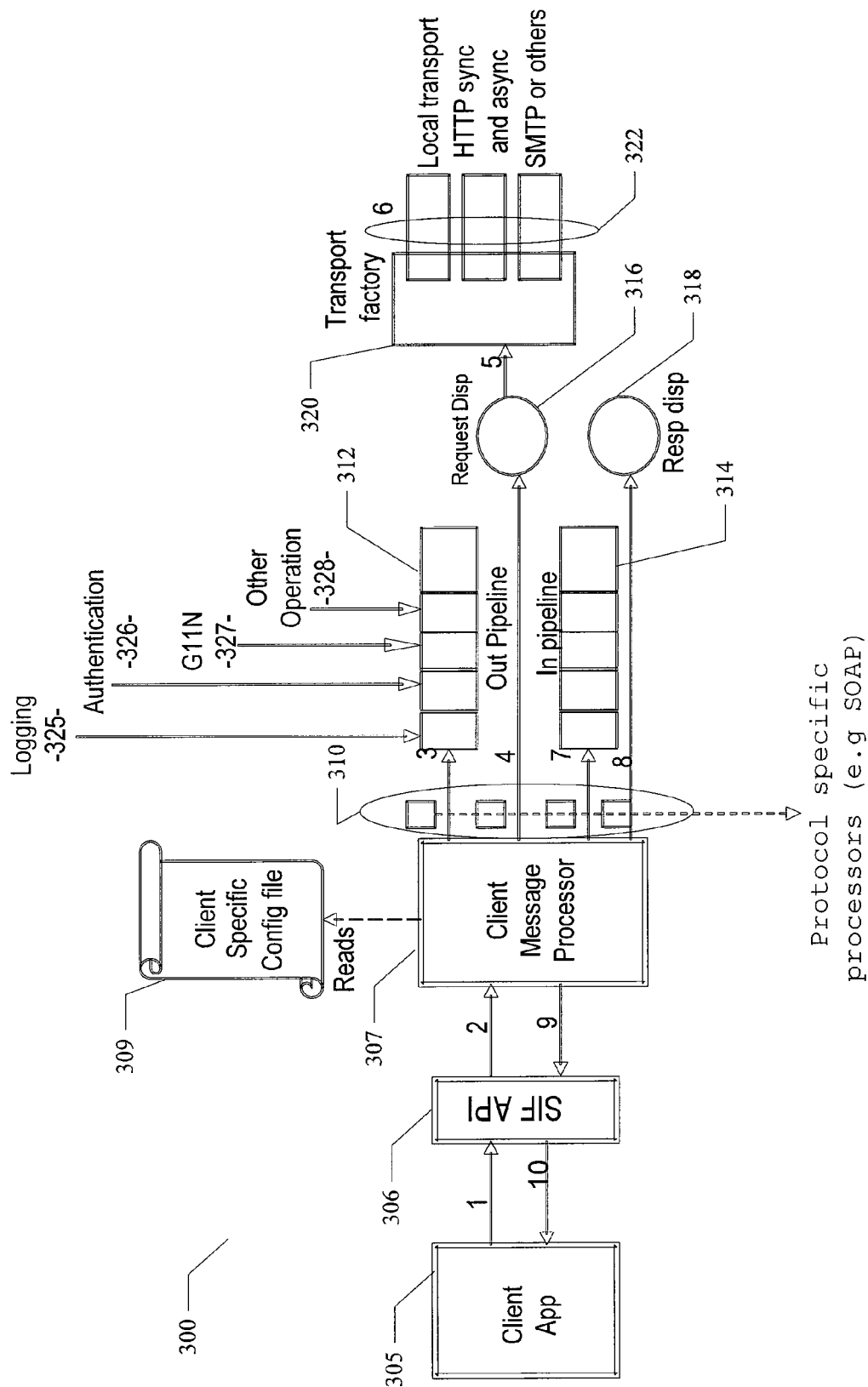
FIG. 3 illustrates an example embodiment of a client-side runtime environment or Service Invocation Framework (SIF), again using a message pipeline.

A Servlet is an object that receives a request and generates a response based on that request. A Servlet container is a specialized web server that supports Servlet execution. The Servlet container combines the basic functionality of a web server with certain Java/Servlet specific optimizations and extensions, such as an integrated Java runtime environment, and the ability to automatically translate specific Uniform Resource Locators (URLs) into Servlet requests. Individual Servlets are registered with a Servlet container, providing the container with information about what functionality they provide, and what URL or other resource locator they will use to identify themselves. The Servlet container is then able to initialize the Servlet as necessary and deliver requests to the Servlet as they arrive. Many containers have the ability to dynamically add and remove Servlets from the system, allowing new Servlets to quickly be deployed or removed without affecting other Servlets running from the same container. Servlet containers are also referred to as web containers or web engines. Servlet interface 104 can be implemented as a servlet container in a particular embodiment. Servlet interface 104 can process incoming synchronous messages and dispatch the processed messages into the Service Provider Framework (SPF) 110 described in more detail below. SPF 110 can receive messages, typically a service request, and after processing the messages in the manner described below, SPF 110 may dispatch the messages to an appropriate service 111. Prior to being dispatched to services 111, the incoming message can be initially processed by a number of modules in a pipelined architecture, each module performing a particular operation on the received message. These processing modules can include a G11N processing module 112. The term "G11N" as used herein refers to the operations of internationalization and localization. In computing, internationalization and localization (also spelled internationalisation and localisation) are means of adapting computer software for non-native environments, especially other nations and cultures. Internationalization is the conventional process of designing a software application so that it can be adapted to various languages and regions without engineering changes. Localization is the conventional process of adapting software for a specific region or language by adding locale-specific components and translating text. Due to their length, the terms are frequently abbreviated to G11N as shown in FIGS. 1-3. Another processing module of SPF 110 can be logging module 114. Logging module 114 is used to record various items of information related to the received message for tracking, debugging, and/or archiving purposes. Another processing module of SPF 110 can be rate limiting module 116. Rate limiting module 116 is used to adjust the flow of messages in a stream to a pre-defined rate limit or threshold. Application level caching module 122 of SPF 110 provides an ability to temporarily store application level information that may be accessed by the application more than once. Application level caching module 122 can provide a higher level of efficiency because the cached information does not need to be re-acquired through a network access. Security module 120 can be provided in SPF 110 to enforce a pre-defined security policy with respect to authentication and authorization. Finally, monitoring module 118 can be provided in SPF 110 to enable monitoring of the service invocation, consumption, status and subsequently to enable alerting conditions and monitoring of compliance with service level agreements (SLA's). All these are examples of some of the "handlers" in the pipeline that control the processing of the message. There are a number of other system level handlers. Service implementers can plug in their own service-specific handlers as needed. The list and order of handlers in the pipeline can be configured and customized as necessary, thus providing a true pluggable pipeline architecture with improved flexibility.

Messages received by system 100 can be configured for a variety of communication protocols. Although many SOA implementations use SOAP as a communications protocol, particular embodiments of system 100 can be used with a communication or messaging protocol that is either a proprietary protocol or some other standard messaging protocol other than SOAP. Most communication protocols for use with SOA implementations, whether SOAP or another protocol, typically use a common basic messaging structure. In general, this messaging structure consists of a message header followed by a message payload or message body. In most cases, the message header contains most of the protocol-specific data. The message payload typically contains data content that is generally common (or can be made common) for all supported communication protocols. For this reason, particular embodiments can isolate protocol-specific message processing into a set of relatively compact protocol-specific message processors—one for each protocol supported by system 100. As will be described in more detail below, the protocol-specific message processors can be 'plugged in' or added to the system 100 architecture without a significant level of re-design or re-configuration of the system. Portions of the incoming message that are common to all supported protocols can be efficiently processed in a message pipeline of SPF 110 as described below. Because the portions of the incoming message processed by the message pipeline of SPF 110 are protocol-agnostic (i.e. not protocol specific), the insertion of a new or different protocol-specific message processor does not affect (and therefore does not require modification to) the message pipeline of SPF 110. In this manner, the embodiments described herein can support a variety of communication protocols in an SOA implementation without causing system re-designs or redundancies. These pluggable protocol processors can be registered in a configuration file. In this manner, various pluggable protocol processors can be conveniently added (i.e. plugged into) or removed from the message pipeline of SPF 110 without significant effort.

Referring now to FIG. 2, a particular example embodiment of a server-side runtime environment or Service Provider Framework (SPF) 200 is illustrated. SPF 200 can receive incoming messages from a requester server via a framework servlet 205. The incoming messages can be a server request for a service supported by the SOA. Messages received by SPF 200 can be configured for a variety of different communication protocols. Framework servlet 205 can handle the receipt, and queuing of the incoming messages, including initialization of appropriate modules. After initial processing, the framework servlet 205 forwards the incoming message to a server message processor 207.

Server Message Processor (SMP) 207 is the main driver for processing the incoming message. At its initialization time, SMP 207 reads all the service configuration files 209 and initializes the appropriate modules, service implementation instances, and any special handlers, etc. Handlers are processing logic components that are plugged into the pipeline in the manner described above. The handlers act on the message, typically just the header portion of the message. Examples of these handlers include security, logging, etc. as shown in FIG. 1 and described above. Service configuration files 209, in a particular example embodiment, are hierarchical and consist of three levels—Global, group, and instance specific. The global configuration file is used to configure things that are common to all services in the deployed environment. The group level configuration file is used to configure things that are common to a group of services (e.g., a specific domain like Search or Trading etc.). The Instance specific configuration file is used to configure things that are specific only to a particular service. The configuration system of SMP 207 allows configuration of much of the functionality provided by system 200. For example, handlers, desired data formats, and protocol processors can all be configured by SMP 207. The SMP 207 manages the processing of the received message through several different, but symmetric processing steps. These processing steps include: processing a request message using the In Pipeline 212, dispatching the processed request message through a request dispatcher 216, processing a response message using the Out Pipeline 214, and dispatching the processed response message through a response dispatcher 218. At each of these steps, the appropriate protocol processor that matches (e.g. is compatible with) the protocol of the incoming message, is also invoked. If any errors occur at any state of processing, the processing flow is intercepted by the Server Message Processor (SMP) 207 and an appropriate error message is returned. The error message can be sent through the Out Pipeline 214 and response dispatcher 218. Thus, SMP 207 is the main driver for the message processing performed in system 200.

As part of the processing operations performed by the server message processor 207, the message header of the incoming message can be decoded to determine the particular protocol for which the incoming message is coded (or compatible with). Once the specific protocol corresponding to the incoming message is determined, a corresponding one of the protocol-specific-processors 210 can be activated to operate upon the header of the incoming message of the same or compatible protocol type. As mentioned above, the specific protocol processor 210 is invoked at each of the processing steps performed by the SMP 207. The specific protocol processor 210 processes the protocol-specific headers (e.g. SOAP envelope, in the case of SOAP) and a context is maintained to reflect the processed information. This context is also made available to the pipeline 212, in case any handler wants to look at the context. Once the specific protocol processor 210 returns, then the message is passed through the input/request pipeline 212. The protocol-agnostic portion of the incoming message (e.g. message payload and transport headers) is run through the input pipeline 212 for staged processing. In a particular embodiment, the pipeline 212 can include several stages. For example, a first stage of pipeline 212 can be a logging stage 225 for handling logging of the incoming message. Logging stage 225 can be used to generate a record for the received message. A second stage of pipeline 212 can be an authentication stage 226 for handling authentication operations on the incoming message. Various types and degrees of message authentication can be implemented at this stage. A third stage of pipeline 212 can be a G11N stage 227 for handling the operations of internationalization and localization on the incoming message. As described above, internationalization and localization operations can be used to regionalize a message so appropriate results are produced. Other stages can be added to pipeline 212 to enable the insertion of one or more pluggable processors for handling a variety of data formats and for decoding a message payload coded in a particular data format. It will be apparent to those of ordinary skill in the art upon reading this disclosure that other stages can similarly be added to pipeline 212 in which other operations 228 could similarly be performed on the protocol-agnostic portions of the incoming message. Further, because of the pipeline architecture of the described embodiment, various stages of the pipeline can be performed in parallel thereby increasing efficiency of the system 100.

Once the protocol-agnostic portion of the incoming message is processed by each of the stages of pipeline 212, the message can be dispatched to a corresponding service implementation module 220 via a request dispatcher 216. At the point where the incoming message is passed to the request dispatcher 216, de-serialization of the message payload is performed, if de-serialization has not already been performed by one of the stages in pipeline 212. It is beneficial to push de-serialization of the message payload to the later stages of processing; because, de-serialization can be a time-consuming and expensive process. The service implementation module 220 can then perform the requested service based on the service request.

As the service implementation module 220 generates output in response to the request for service, server message processor 207 can perform post-processing on the protocol-agnostic portion of the output data using an output pipeline 214. In a manner similar to input pipeline 212, output pipeline 214 can be divided into stages, each stage performing an operation on the protocol-agnostic portion of the output data. Once the protocol-agnostic portion of the output data is processed by each of the stages of pipeline 214, the protocol-specific portion of the output data is processed by the one of the protocol-specific processors 210. At this point, the output message, which can either be an output data message generated in response to the service request or an error message, can be dispatched to a transport module 222 via the response dispatcher 218. Transport module 222 can deliver the output message to a service requester via a selected transport. In the case of a synchronous communication, the transport module may simply return to the SMP 207, which in turn returns the response to the servlet container.

Referring now to FIG. 3, a particular example embodiment of a client-side runtime environment or Service Invocation Framework (SIF) 300 is illustrated. SIF 300 can receive incoming messages from a client application requester 305 via an SIF application programming interface (API) 306 or through a pre-generated proxy. The incoming messages can be a client request for a service supported by the SOA. A client message processor 307 receives the incoming message either way.

The Client Message Processor (CMP) 307, in a particular example embodiment, is the main driver for processing the outgoing request message and for handling the received response. This is very much equivalent to the SMP 207 on the server side. The CMP 307 performs processing operations similar to the SMP 207; however, the CMP 307 operates on the client side. These processing operations, as described above, include running the request message through the request pipeline (Out pipeline 312), request dispatcher 316, response pipeline (In pipeline 314) and response dispatcher 318. Similar to the processing performed on the server side, an appropriate protocol-specific processor 310 is also invoked at each of these processing steps to formulate a request message that contains the selected protocol-specific envelope. Similarly, an appropriate protocol-specific processor 310 is also invoked for processing of the protocol-specific envelope in the response message as well. Again, similar to the server side, the client side also uses a hierarchy of configuration files, such as global, group and instance-specific configurations. As described above, the CMP 307 is responsible for managing these configurations.

As part of the processing operations performed by the client message processor 307, the message header of the outgoing message needs to be encoded to reflect the selected protocol. To do this, a corresponding one of the protocol-specific message processors 310 is activated to encode the header of the outgoing message of the same or compatible protocol type. Once the specific protocol processor 310 returns, the outgoing message is run through the request pipeline (Out pipeline 312) for staged processing of the protocol-agnostic portion of the message. In a particular embodiment, the pipeline 312 can include several stages. For example, a first stage of pipeline 312 can be a logging stage 325 for handling logging of the incoming message. Logging stage 325 can be used to generate a record for the received message. A second stage of pipeline 312 can be an authentication stage 326 for inserting the security credentials, authentication coding, and the like. As many stages can be added to pipeline 312 as necessary to enable customization of message processing. In fact, every portion of processing logic can be added as a stage (also referred to as a Handler) in the pipeline 312. Further, because of the pipeline architecture of the described embodiment, various stages of the pipeline can be performed in parallel thereby increasing efficiency of the system 100.

Once the protocol-agnostic portion of the outgoing message is processed by each of the stages of pipeline 312, the request message is dispatched to a transport factory module 320 via a request dispatcher 316. The request dispatcher 316 serializes the outgoing message into the wire data format that is selected/configured, before handing off the message to the transport factory module 320. The transport factory module 320 delegates transport of the message via one of a plurality of pluggable transport processors 322. A particular embodiment can offer support for a plurality of transport modes and protocols, such as a local transport (useful when the client and server are deployed in the same Java Virtual Machine—JVM), Hypertext Transport Protocol (HTTP), Simple Mail Transfer Protocol (SMTP), and the like. The transport factory module 320 sends the request message to the server via the respective one of the pluggable transport processors 322. The particular pluggable transport processor 322 chosen for transport of the request message can be configured by the CMP 307. It will be apparent to those of ordinary skill in the art upon reading this disclosure that other specific transport modes/protocols can similarly be added to transport factory 320 to enable transport of the processed request message in a variety of ways.

As the service implementation (on the server side) generates output in response to the request for service, the transport factory module 320 receives this response and passes control to the client message processor 307. Client message processor then invokes the appropriate protocol-specific processor 310 for processing the protocol-specific portion of the response message. The CMP 307 then runs the response message through the response pipeline (In pipeline) 314. In a manner similar to request pipeline 312, response pipeline 314 is also divided into stages, each stage performing an operation on the protocol-agnostic portion of the incoming response data. At this point, the incoming response message, which can be output data in response to a service request, is dispatched to a response dispatcher 318. Additionally, the client message processor 307 can send a response to the client application requester 305 via the SIF API 306.

Figure 4:
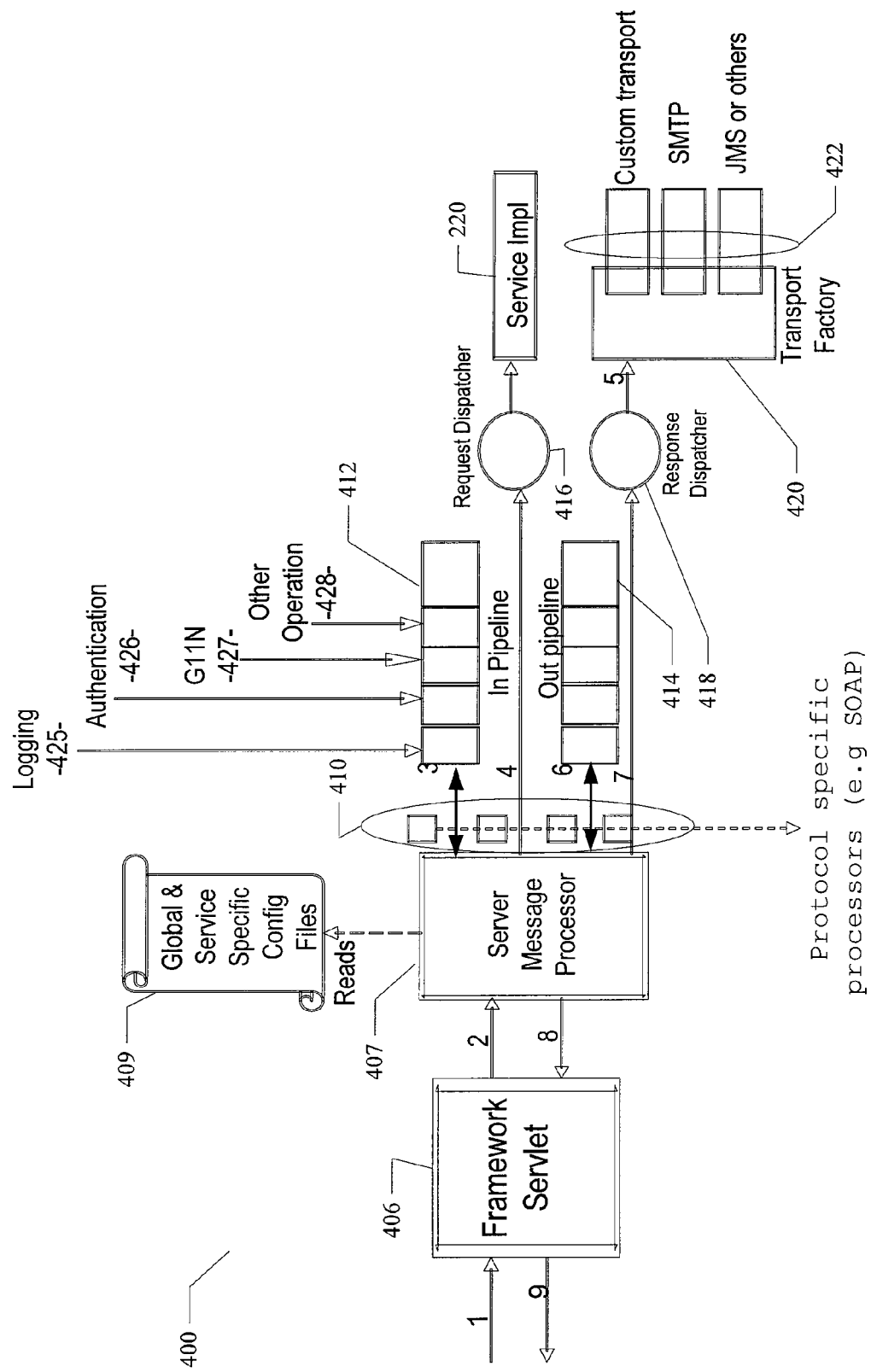
FIG. 4 illustrates another example embodiment of a server-side runtime environment or Service Provider Framework (SPF), using pluggable transport mechanisms.

FIG. 4 illustrates another example embodiment of the server-side runtime environment or Service Provider Framework (SPF) 400. As shown in FIG. 4, SPF 400 includes much of the same structure as shown in FIG. 2 and described above. However, in the example embodiment shown in FIG. 4, SPF 400 includes a transport factory 420 coupled to response dispatcher 418. In this embodiment, the response message is dispatched to the transport factory module 420 via the response dispatcher 418. The response dispatcher 418 serializes the outgoing message into the wire data format that is selected/configured, before handing off the message to the transport factory module 420. The transport factory module 420 delegates transport of the message via one of a plurality of pluggable transport processors 422. A particular embodiment can offer support for a plurality of transport modes and protocols, such as a custom transport (useful when the client and server are deployed in the same environment and need an efficient and proprietary protocol)), Hypertext Transport Protocol (HTTP), Simple Mail Transfer Protocol (SMTP), and the like. The transport factory module 420 sends the response message to the requester via the respective one of the pluggable transport processors 422. The particular pluggable transport processor 422 chosen for transport of the response message can be configured by the Server Message Processor (SMP) 407. It will be apparent to those of ordinary skill in the art upon reading this disclosure that other specific transport modes/protocols can similarly be added to transport factory 420 to enable transport of the processed response message in a variety of ways.

Thus, as described above in connection with FIGS. 3 and 4, both the server-side runtime environment and the client-side runtime environment can be provided with a transport factory including a plurality of pre-configured and selectable transport mechanisms. The information about the desired response transport can be sent with the message over the wire in the request message, indicating to the server what transport should be used for response. If such a transport is not available on the server side for sending the response, based on the client configuration (hard or soft), either the request is rejected or the response is sent back on the same transport as the request. If a request goes out via one transport, say transport 1, and the response comes back via a different transport, say transport 2, then on the client side, the equivalent receiving transport 2 needs to be configured and listening for the response as well. Additional pluggable transports can be implemented, plugged in and configured without altering the base SOA framework and hence without affecting any existing clients and services. New transports can be added to the client-side environment by using a code sample shown in FIG. 5. Plugging in transports at the server side is similar to that for the client side as shown in FIG. 5. The pluggable transport configuration information can be specified at the client side in a client-config.xml file. The pluggable transport configuration information can be specified at the server side in a service-config.xml.

FIG. 5 illustrates a portion of code that may be used to configure a pluggable transport mechanism in a particular embodiment The response transport, as desired by a client and sent across in the request message, is automatically selected for response on the server side (assuming the selected transport is available) by going through the transport factory as shown. If the selected response transport is HTTP, then the response simply amounts to a return to the servlet container, which handles the HTTP response. If the client selects, "Local-Transport" as a pluggable transport mechanism, then this selected transport mechanism is equivalent to using no physical transport and making an in-JVM call (i.e., a local java call). In a Local Transport, there is provided an option to skip serialization/deserialization for optimization purposes.

FIG. 6 illustrates a portion of code that may be used to specify the use of a particular pluggable transport mechanism in a particular embodiment.

Figure 7:
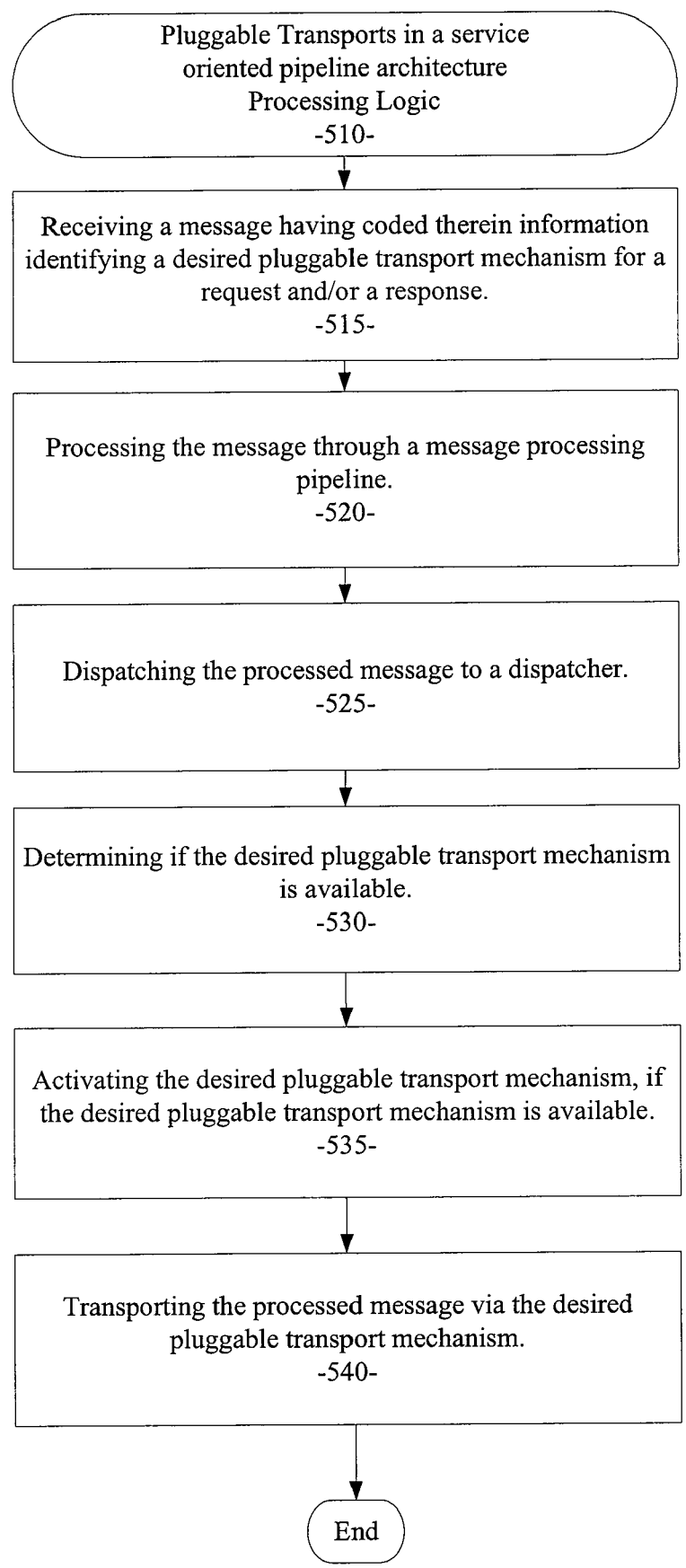
FIG. 7 illustrates a processing flow diagram for an example embodiment.

FIG. 7 illustrates a processing flow diagram for an example embodiment. In the embodiment 510 shown, an apparatus for processing messages using pluggable transport processors in a service-oriented pipeline architecture performs the processing operations of: receiving a message having coded therein information identifying a desired pluggable transport mechanism for a request and/or a response (processing block 515); processing the message through a message processing pipeline (processing block 520); dispatching the processed message to a dispatcher (processing block 525); determining if the desired pluggable transport mechanism is available (processing block 530); activating the desired pluggable transport mechanism, if the desired pluggable transport mechanism is available (processing block 535); and transporting the processed message via the desired pluggable transport mechanism (processing block 540).

Figure 8:
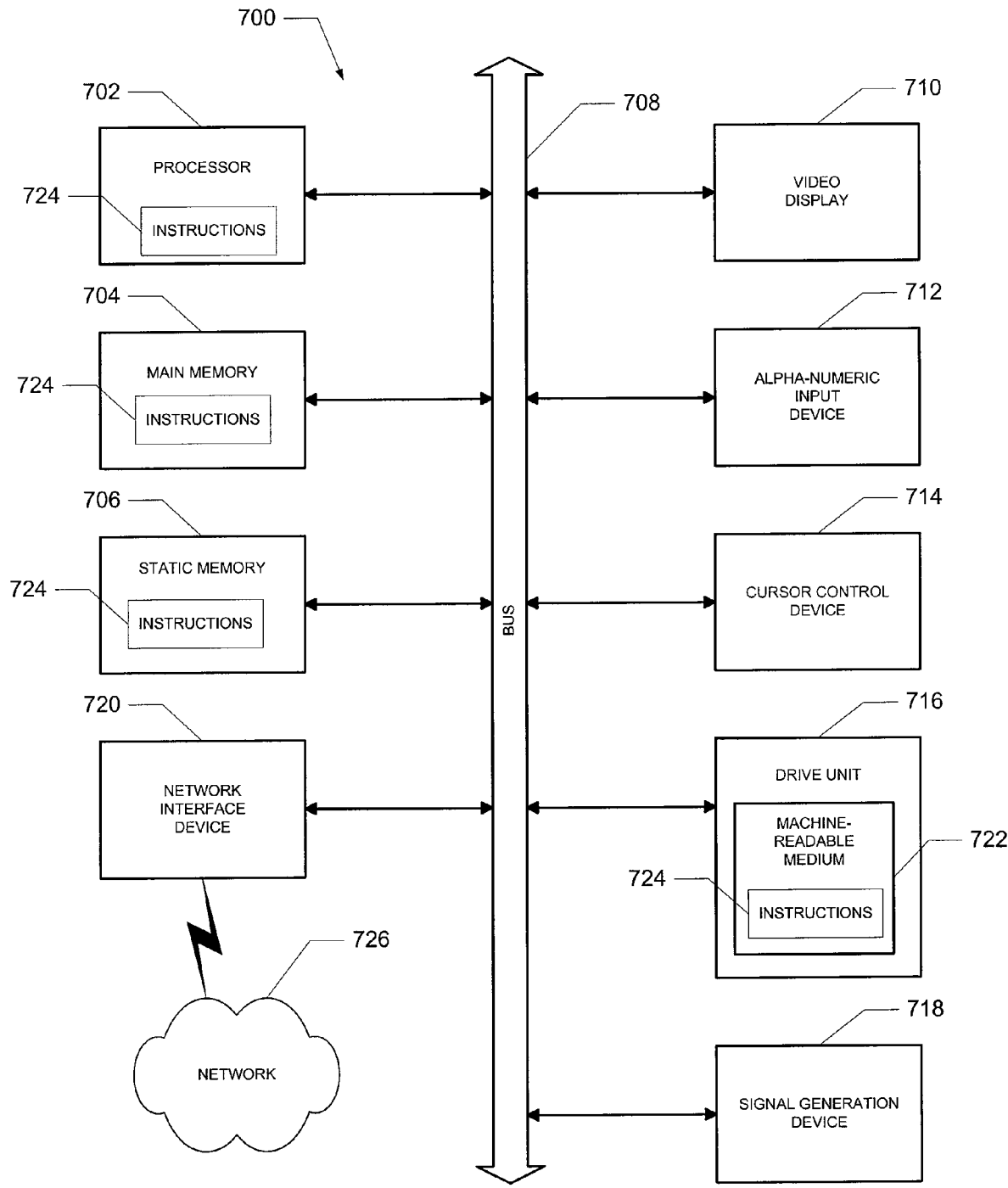
FIG. 8 shows a diagrammatic representation of a machine in the form of a computer system within which a set of instructions, for causing the machine to perform any one or more of the methodologies discussed herein, may be executed, according to an example embodiment.

FIG. 8 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for decoupling processing of request and response messages supporting different pluggable respective transports in a service-oriented pipeline architecture are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
receiving a message having coded therein information identifying a desired pluggable transport mechanism for a request and/or a response;
activating one of a plurality of pluggable protocol processors compatible with the received message;
processing, by use of a processor, a protocol-specific portion of the received message using the activated pluggable protocol processor;
processing, by use of the processor, a protocol-agnostic portion of the received message using a message processing pipeline, the message processing pipeline including a plurality of stages for processing the protocol-agnostic portion of the received message, the protocol-specific portion and the protocol-agnostic portion being portions of the same received message;
dispatching the processed message to a dispatcher;
determining if the desired pluggable transport mechanism is available;
activating the desired pluggable transport mechanism, if the desired pluggable transport mechanism is available; and
transporting the processed message via the desired pluggable transport mechanism.

2. The method as claimed in claim 1 including configuring a plurality of pluggable transport mechanisms for use by the dispatcher.

3. The method as claimed in claim 1 wherein the message processing pipeline and the dispatcher are provided in a client-side environment.

4. The method as claimed in claim 1 wherein the message processing pipeline and the dispatcher are provided in a server-side environment.

5. The method as claimed in claim 1 wherein an example desired pluggable transport mechanism uses a Simple Mail Transfer Protocol (SMTP).

6. The method as claimed in claim 1 wherein an example desired pluggable transport mechanism uses a "Local Transport".

7. The method as claimed in claim 1 including passing the processed message to a transport factory having a plurality of pluggable transport processors.

8. The method as claimed in claim 7 wherein the plurality of pluggable transport processors includes at least one pluggable transport processor from the group: Local Transport processor, Hypertext Transport Protocol (HTTP) processor, and Simple Mail Transfer Protocol (SMTP) processor.

9. The method as claimed in claim 8, wherein the request and response messages can use different transports, in a request-response Message Exchange Pattern (MEP).

10. An apparatus comprising:
a processor;
a message processor, for execution by the processor, to receive a message having coded therein information identifying a desired pluggable transport for a request and/or a response, to activate one of a plurality of pluggable protocol processors compatible with the received message, to process a protocol-specific portion of the received message using the activated pluggable protocol processor, to process a protocol-agnostic portion of the received message using a message processing pipeline, the message processing pipeline including a plurality of stages for processing the protocol-agnostic portion of the received message, the protocol-specific portion and the protocol-agnostic portion being portions of the same received message, and to dispatch the processed message to a dispatcher; and
a transport factory coupled to the dispatcher, the transport factory including a plurality of pluggable transports, the transport factory to determine if the desired pluggable transport is available, to activate the desired pluggable transport, if the desired pluggable transport is available, and to transport the processed message via the desired pluggable transport.

11. The apparatus as claimed in claim 10 wherein the message processor and the transport factory are provided in a client-side environment.

12. The apparatus as claimed claim 10 wherein the message processor and the transport factory are provided in a server-side environment.

13. The apparatus as claimed claim 10 wherein an example desired pluggable transport uses a Simple Mail Transfer Protocol (SMTP).

14. The apparatus as claimed in claim 10 wherein an example desired pluggable transport uses a Local Transport.

15. The apparatus as claimed in claim 10 wherein the plurality of pluggable transports includes at least one pluggable transport from the group: local transport processor, Hypertext Transport Protocol (HTTP) processor, and Simple Mail Transfer Protocol (SMTP) processor.

16. The apparatus as claimed in claim 10 wherein the request and response messages can use different transports, in a request-response Message Exchange Pattern (MEP).

17. An article of manufacture comprising a non-transitory machine-readable storage medium having machine executable instructions embedded thereon, which when executed by a machine, cause the machine to:

receive a message having coded therein information identifying a desired pluggable transport mechanism for a request and/or a response;
activate one of a plurality of pluggable protocol processors compatible with the received message;
process a protocol-specific portion of the received message using the activated pluggable protocol processor;
process a protocol-agnostic portion of the received message using a message processing pipeline, the message processing pipeline including a plurality of stages for processing the protocol-agnostic portion of the received message, the protocol-specific portion and the protocol-agnostic portion being portions of the same received message;
dispatch the processed message to a dispatcher;
determine if the desired pluggable transport mechanism is available;
activate the desired pluggable transport mechanism, if the desired pluggable transport mechanism is available; and
transport the processed message via the desired pluggable transport mechanism.

18. The article of manufacture as claimed in claim 17 wherein the message processing pipeline and the dispatcher are provided in a client-side environment.

19. The article of manufacture as claimed in claim 17 wherein the message processing pipeline and the dispatcher are provided in a server-side environment.

20. The article of manufacture as claimed in claim 17 being further configured to pass the processed message to a transport factory having a plurality of pluggable transport processors.

21. The article of manufacture as claimed in claim 20 wherein the plurality of pluggable transport processors includes at least one pluggable transport processor from the group: local transport processor, Hypertext Transport Protocol (HTTP) processor, and Simple Mail Transfer Protocol (SMTP) processor.

22. The article of manufacture as claimed in claim 20 wherein the request and response messages can use different transports, in a request-response Message Exchange Pattern (MEP).

23. A system comprising:
a processor;
a memory coupled to the processor to store information related to messages;
a message processor, in data communication with the processor and the memory, to receive a message having coded therein information identifying a desired pluggable transport for a request and/or a response, to activate one of a plurality of pluggable protocol processors compatible with the received message, to process a protocol-specific portion of the received message using the activated pluggable protocol processor, to process a protocol-agnostic portion of the received message using a message processing pipeline, the message processing pipeline including a plurality of stages for processing the protocol-agnostic portion of the received message, the protocol-specific portion and the protocol-agnostic portion being portions of the same received message, and to dispatch the processed message to a dispatcher; and a transport factory coupled to the dispatcher and in data communication with the processor and the memory, the transport factory including a plurality of pluggable transports, the transport factory to determine if the desired pluggable transport is available, to activate the desired pluggable transport, if the desired pluggable transport is available, and to transport the processed message via the desired pluggable transport.

24. The system as claimed in claim 23 wherein the message processor and the transport factory are provided in a client-side environment.

25. The system as claimed in claim 23 wherein the message processor and the transport factory are provided in a server-side environment.

* * * * *

UNITED STATES PATENT AND TRADEMARK OFFICE
CERTIFICATE OF CORRECTION

PATENT NO. : 8,341,280 B2  
APPLICATION NO. : 12/346742  
DATED : December 25, 2012  
INVENTOR(S) : Malladi et al.

Page 1 of 2

It is certified that error appears in the above-identified patent and that said Letters Patent is hereby corrected as shown below:

On the Title Page, Item (56)

In column 2, under "Other Publications", line 1, after "12/242,639", insert --,--, therefor On page 2, in column 2, under "Other Publications", line 5, delete "14/242,639" and insert --12/242,639,--, therefor On page 2, in column 2, under "Other Publications", line 11, delete "Aliowance maiied" and insert --Allowance mailed--, therefor On page 2, in column 2, under "Other Publications", line 15, delete "12/242,653 ," and insert --12/242,653,--, therefor In the Drawings Sheet 2 of 8, Fig. 2, reference numeral 220, line 1, delete "ServiceImpl" and insert --Service Impl--, therefor In the Specification In column 1, line 38, delete "efficiently" and insert --efficiency--, therefor In column 2, line 28, delete "implementing" and insert --implementation of--, therefor In column 4, line 62, delete "internationalization" and insert --internationalisation--, therefor In column 4, line 62-63, delete "localization" and insert --localisation--, therefor Signed and Sealed this  
Second Day of December, 2014

Michelle K. Lee  
*Deputy Director of the United States Patent and Trademark Office*

CERTIFICATE OF CORRECTION (continued)
U.S. Pat. No. 8,341,280 B2

In column 6, line 24, after "etc.", insert --,--, therefor

In column 6, line 27, after "Global" insert --global--, therefor

In column 6, line 62-63, delete "specific protocol" and insert --protocol specific--, therefor In column 7, line 2, delete "specific protocol" and insert --protocol specific--, therefor In column 7, line 19, after "so", insert --that--, therefor In column 8, line 41, before "pipeline", insert --out--, therefor In column 8, line 46, before "pipeline", insert --out--, therefor In column 8, line 52, before "pipeline", insert --out--, therefor In column 9, line 15, after "pipeline", insert --(Out pipeline)--, therefor In column 9, line 40, delete ")),"  and insert --),--, therefor In column 10, line 13, after "embodiment", insert --.--, therefor In column 10, line 33, after "therein", insert --,--, therefor In the Claims In column 13, line 46, in Claim 12, delete "claim" and insert --in claim--, therefor In column 13, line 49, in Claim 13, delete "claim" and insert --in claim--, therefor